United States Patent [19]

Merkle et al.

[11] Patent Number: 5,718,651
[45] Date of Patent: Feb. 17, 1998

[54] DRIVING ARRANGEMENT FOR A MOTOR VEHICLE

[75] Inventors: Hans Merkle, Stuttgart; Hubert Mueller, Tiefenbronn, both of Germany

[73] Assignee: Mercedes-Benz AG, Stuttgart, Germany

[21] Appl. No.: 695,604

[22] Filed: Aug. 12, 1996

[30] Foreign Application Priority Data

Aug. 11, 1995 [DE] Germany .................. 195 29 586.2

[51] Int. Cl.⁶ .................................................. F16H 57/04
[52] U.S. Cl. .................. 475/159; 475/160; 74/606 R
[58] Field of Search ...................... 74/606 R; 475/159, 475/160, 161, 198, 201; 184/6.12

[56] References Cited

U.S. PATENT DOCUMENTS

| | | | |
|---|---|---|---|
| 3,838,751 | 10/1974 | Brown | 475/160 X |
| 4,319,499 | 3/1982 | Sanui et al. | 475/159 X |
| 4,879,921 | 11/1989 | Asada et al. | 74/606 R X |
| 5,279,188 | 1/1994 | Martin et al. | 74/606 R |
| 5,445,041 | 8/1995 | Zaiser et al. | 74/331 |
| 5,505,112 | 4/1996 | Gee | 74/606 R |

FOREIGN PATENT DOCUMENTS

| | | | |
|---|---|---|---|
| 0 512 214 | 11/1992 | European Pat. Off. | |
| 1199681 | 12/1959 | France . | |
| 19 46 942 | 9/1965 | Germany . | |
| 39 06 330 | 2/1990 | Germany . | |
| 39 39 651 | 5/1991 | Germany . | |
| 43 18 713 | 9/1994 | Germany . | |
| 0094672 | 6/1983 | Japan | 475/160 |
| 60-176821 | 9/1985 | Japan | 475/160 |
| 5-106710 | 4/1993 | Japan | 475/159 |
| 5-180308 | 7/1993 | Japan | 475/159 |

*Primary Examiner*—Khoi Q. Ta
*Attorney, Agent, or Firm*—Evenson, McKeown, Edwards & Lenahan, P.L.L.C.

[57] ABSTRACT

In the case of a driving arrangement for a motor vehicle having a gearing casing which carries a gear box shaft with a gearwheel which is situated in parallel to a geometrical main axis and having a partial casing which carries differential gearing which has a ring gear meshing with the gear wheel and is arranged centrically with respect to the main axis, a storage chamber is provided in the partial casing which is concentric with respect to the main axis.

14 Claims, 4 Drawing Sheets

DRIVING ARRANGEMENT FOR A MOTOR VEHICLE

BACKGROUND AND SUMMARY OF THE INVENTION

This invention relates to a driving arrangement and, more particularly, to a driving arrangement for a motor vehicle, having a differential gearing arranged by means of its central axis in an alignment with a geometrical main axis of a driving axle. A ring gear is non-rotatably connected with the planet wheel carrier of the differential gearing. The ring gear is arranged concentrically with respect to the central axis and meshes with a gear wheel of a gear box shaft of a gear change box arranged by means of its axis of rotation in parallel to the geometrical main axis. A gearing casing carries the gear box shaft and a partial casing carries the differential gearing. The partial casing is arranged immovably and in a liquid-tight manner with respect to the gearing casing. In the partial casing, the ring gear is also accommodated at least partially. A casing passage connects the casing interiors of the gearing casing and the partial casing with one another.

A driving arrangement of the above-mentioned type is known from European patent application EP 0 512 214 A2.

In the case of driving arrangements of the above-mentioned type, the differential gearing is also situated at the lowest point. This is why the oil flowing back from the gear change box has the tendency to accumulate in the casing interior of the partial casing accommodating the differential gearing. This results in a lack of oil in the gear change box and in an increased splashing operation of the ring gear in the accumulating oil quantity in the partial casing.

There is therefore needed an arrangement which avoids the disadvantages which occur as the result of the oil accumulation in the partial housing, as are indicated above.

According to the present invention, these needs are met by a driving arrangement for a motor vehicle, having a differential gearing arranged by means of its central axis in an alignment with a geometrical main axis of a driving axle. A ring gear is non-rotatably connected with the planet wheel carrier of the differential gearing. The ring gear is arranged concentrically with respect to the central axis and meshes with a gear wheel of a gear box shaft of a gear change box arranged by means of its axis of rotation in parallel to the geometrical main axis. A gearing casing carries the gear box shaft and a partial casing carries the differential gearing. The partial casing is arranged immovably and in a liquid-tight manner with respect to the gearing casing. In the partial casing, the ring gear is also accommodated at least partially. A casing passage connects the casing interiors of the gearing casing and the partial casing with one another. The partial casing has a storage chamber which extends at least partially concentrically with respect to the main axis and which encloses the differential gearing at least partially. With respect to the main axis, the storage chamber is arranged axially next to the ring gear. The storage chamber has an upper inlet opening situated in the area of the gear rim of the ring gear, a lower opening leading into the casing interior of the partial casing which accommodates the ring gear, and an outlet opening communicating with the casing passage. The casing passage has a mouth section in the casing interior of the partial casing which is situated in the area of the gear rim of the ring gear. The lower opening can be closed by a stop valve which can be controlled as a function of the temperature.

In the case of the driving arrangement according to the invention, an opening is arranged at the lowest point of the storage chamber provided according to the invention. The opening can be closed as a function of the temperature by a bimetal-controlled stop valve. The characteristic curve of the bimetal can be selected such that, up to an oil temperature of approximately 70° C., the stop valve is open, but that it is closed at higher temperatures. As a result, it is achieved that, at lower temperatures, the oil flowing in by way of the upper inlet opening of the storage chamber flows off by way of the open stop valve into the casing interior of the partial casing accommodating the ring gear and can be transported from there by means of the ring gear immediately to the oil pan of the gearing casing. This ensures that sufficient oil is present in the oil pan in order to prevent the taking-in of air by the oil pump. In this case, the storage chamber is largely empty. At higher temperatures at which the stop valve is closed, the storage chamber fills up to the overflow edge by way of the inlet opening. From there, the oil flows by way of a casing duct to the oil pan. In this manner, the oil level fluctuation, which occurs because of the thermal expansion of the oil, can be reduced corresponding to the volume of the storage chamber. The harmful rising of the oil in the case of a hot gearing is therefore largely avoided. In order to obtain a large storage volume, the casing interior of the partial casing can intentionally be dimensioned to be large. The storage chamber can be situated closely next to the ring gear, whereby its splashing performance and therefore the dissipation loss, as well as the foaming of the oil, can be reduced. By means of this close encapsulating of the ring gear, the oil can effectively be skimmed off from the casing interior.

In the case of the driving arrangement according to the present invention, a further embodiment provides for the oil leaving the storage chamber by way of its outlet opening to be introduced into the oil pan in an undisturbed manner at a point between a lateral wall of the oil pan and a control housing of the shifting device which projects into the oil pan in the normal fashion.

In the case of the driving arrangement according to the invention, an advantageous transfer of the oil quantities leaving the storage chamber by way of the outlet opening into the gearing casing is also achieved via a preferred embodiment.

In the case of the driving arrangement according to the invention, the storage chamber may, for example, have a one-piece construction of the chamber walls with the partial casing accommodating the differential gearing.

In an advantageous embodiment of the driving arrangement according to the invention, a casing insert is used for the storage chamber.

An advantageous arrangement and further development uses a casing insert as a storage chamber.

Functional details of the gear change box are indicated in U.S. Pat. No. 5,445,041, the specification of which is expressly incorporated by reference herein. However, these details are not necessary to an understanding of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
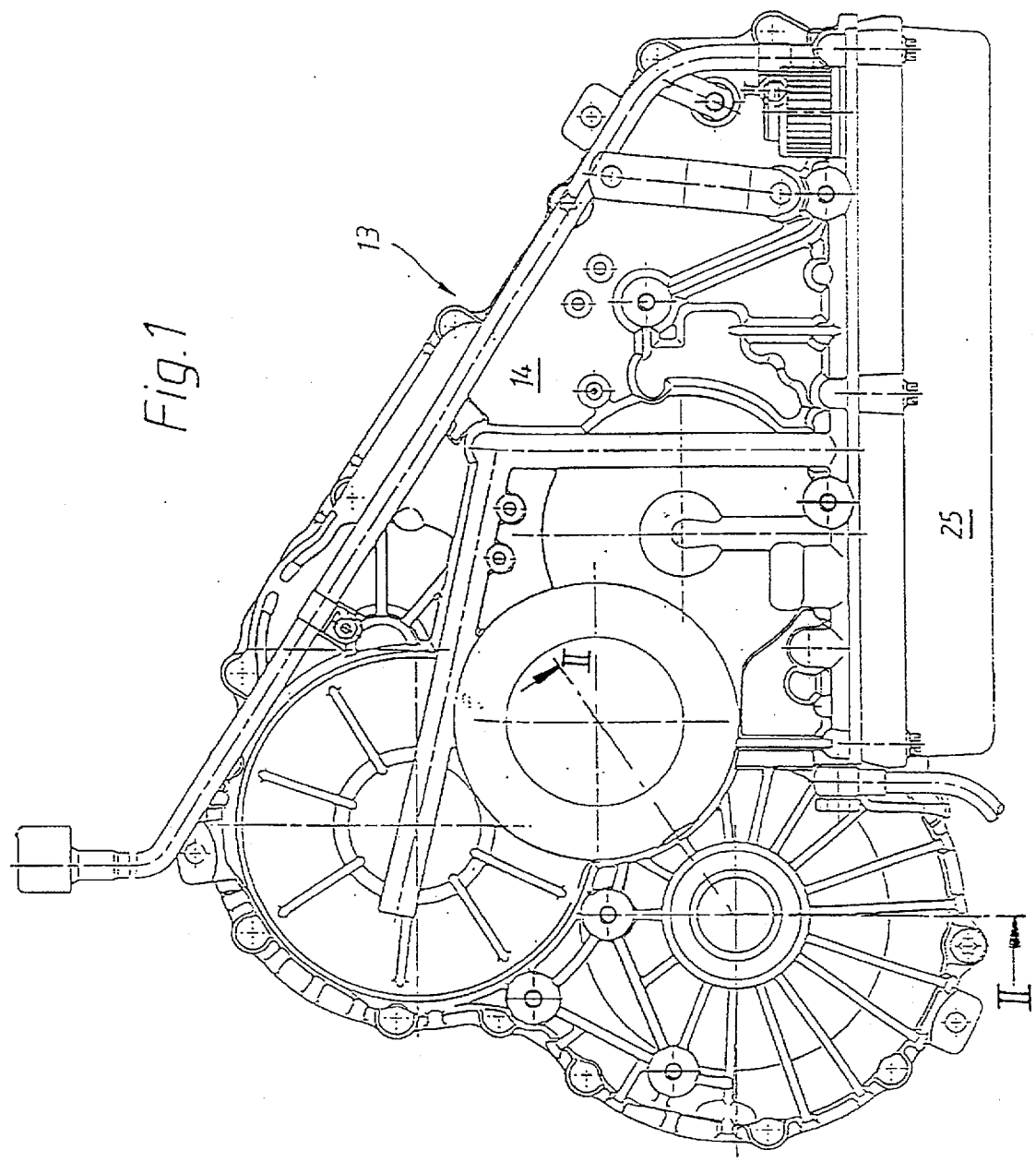
FIG. 1 is a lateral view of a driving arrangement according to the invention viewed in the direction of the arrow I of FIG. 2.
Figure 2:
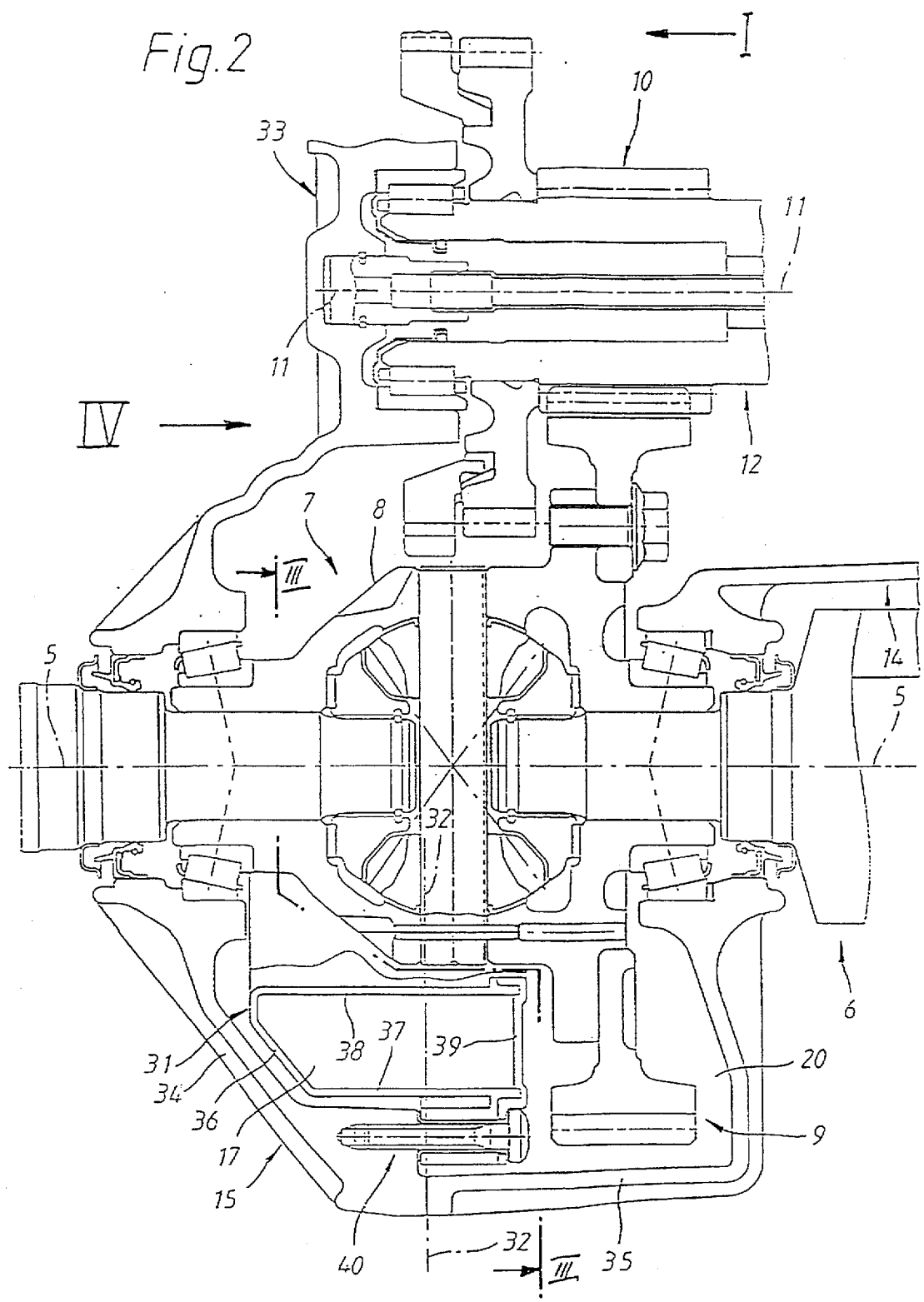
FIG. 2 is a partial sectional view of the driving arrangement taken along Line II—II of FIG. 1.

Referring to FIGS. 1 and 2, a gear change box 13 of a motor vehicle has a gearing casing 14 in which a gear box shaft 12, which has a gear wheel 10 and forms the gearing outlet, is rotatably disposed in the normal manner. With its axis of rotation 11—11, the gear box shaft 12 is arranged in parallel to a geometrical main axis 5—5 of a driving axle 6 whose differential gearing 7 is situated so that its central axis is coaxial with respect to the main axis 5—5 and is disposed in a partial casing 15. In a casing plane 32—32 which is perpendicular to the main axis 5—5, the partial casing 15 is divided into a casing part 34 constructed in one piece with a converter housing 33 and a casing part 35 constructed in one piece with the gearing casing 14. In a conventional manner, a ring gear, which is centric with respect to the main axis 5—5, is immovably screwed to the differential gearing casing 8 which is used as the planet wheel carrier for the revolving differential bevel gears of the differential gearing 7. The ring gear 9 meshes with the gear wheel 10 of the gear box shaft 12.

Figure 3:
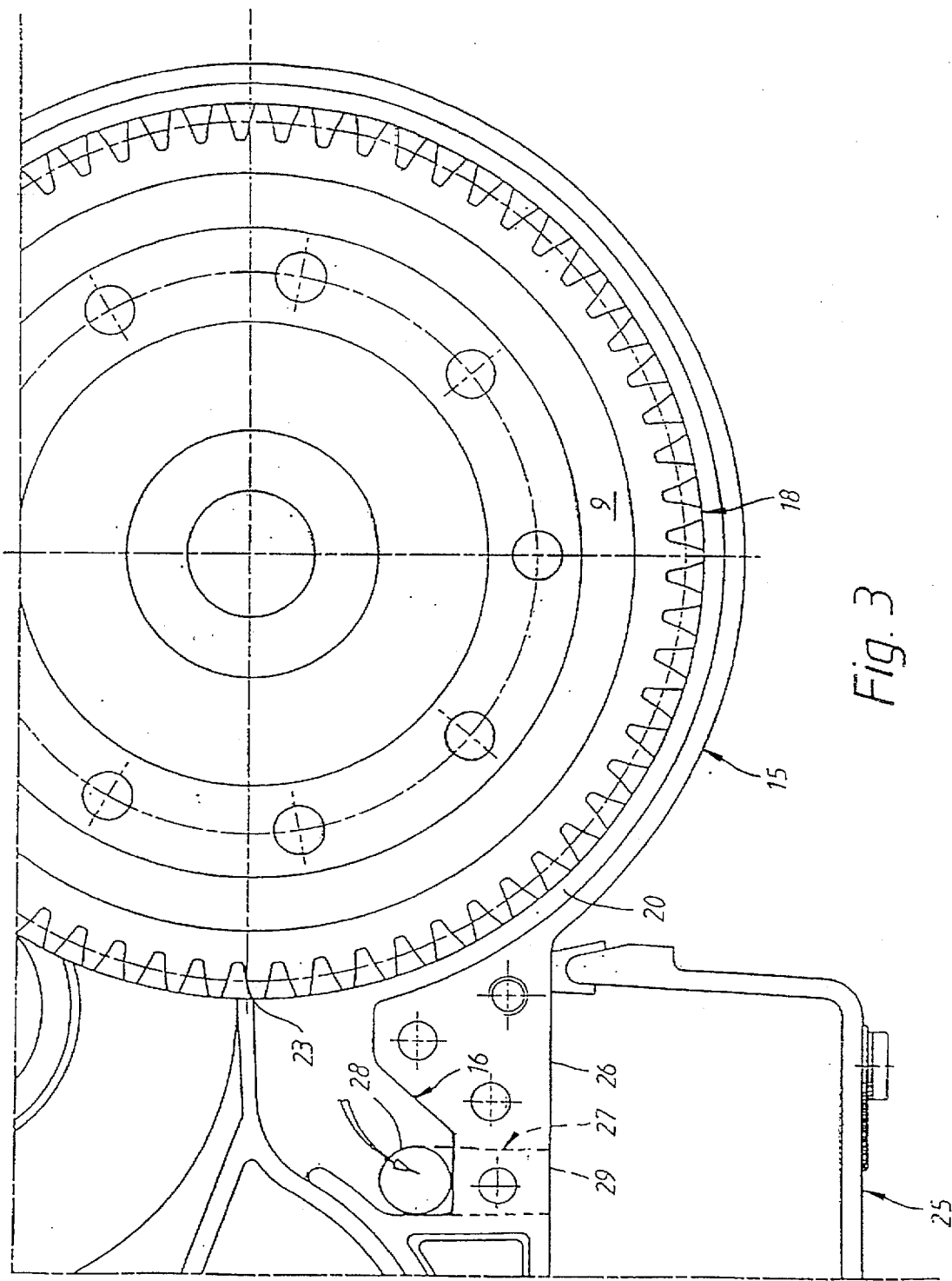
FIG. 3 is a partial sectional view of the driving arrangement of FIG. 1 according to Line III—III of FIG. 2.
Figure 4:
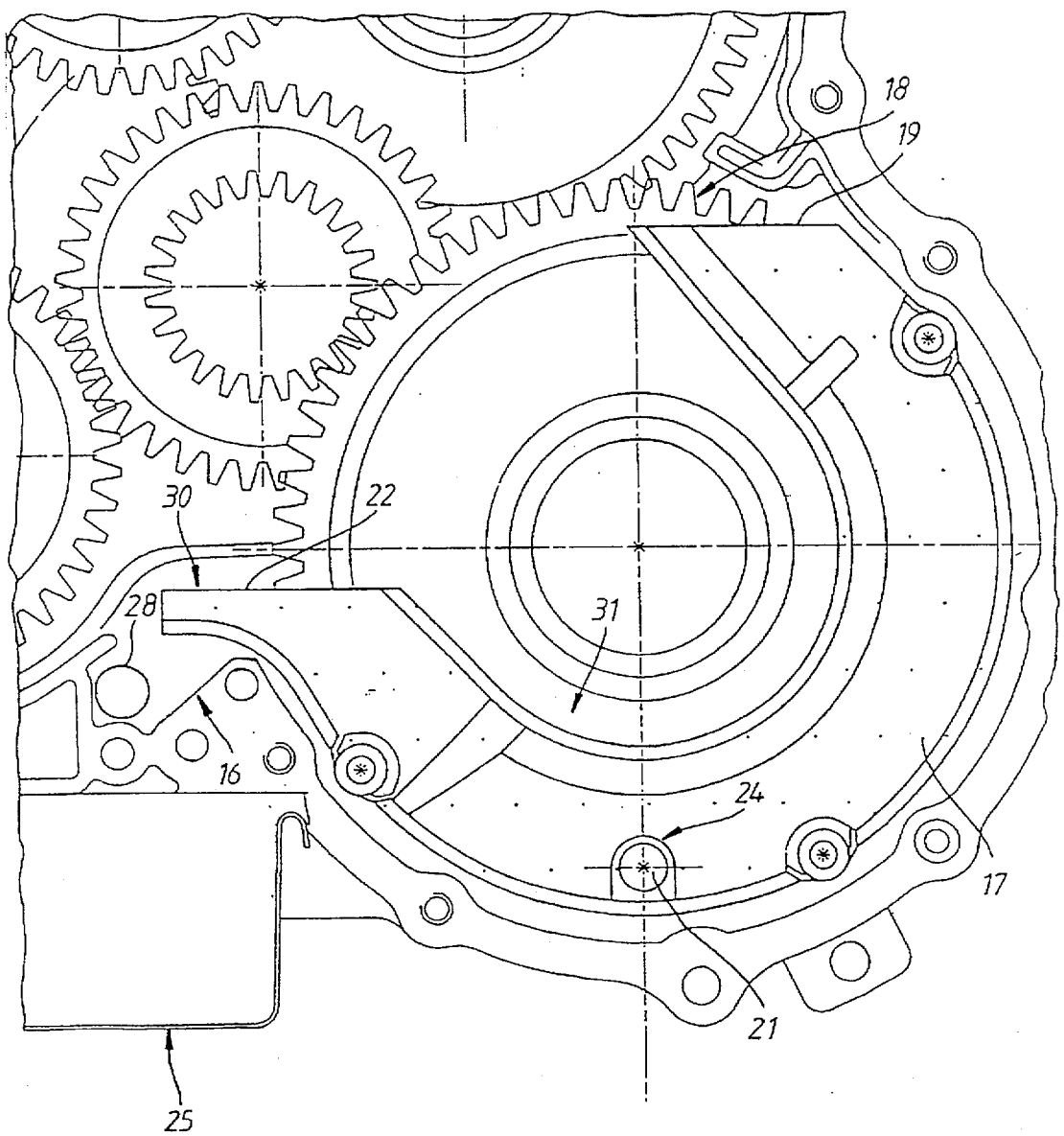
FIG. 4 is a lateral partial view of the driving arrangement of FIG. 1 in the direction of the arrow IV of FIG. 2, the casing part 34 being considered to be removed.

Referring to FIGS. 3 and 4, in the casing interior 20 of the partial casing 15, an essentially ring-shaped casing insert 31 is provided which concentrically encloses a large portion of the differential gearing casing 8, is arranged axially next to the ring gear 9 and is used as an intermediate storage device for the gear box oil. The casing insert 31 consists of a hollow body 36 with a U-shaped cross-section and with leg walls 37 and 38 which, in the installed position, are parallel to the main axis 5—5. The casing insert 31 also consists of a ring-shaped end cover 39 which is concentric with respect to the main axis 5—5. The hollow body 36 is fixedly clamped in between the end cover 39 and the casing part 34 via screw bolts.

The hollow space of the casing insert 31 is used as a storage chamber 17 which is connected via an inlet opening 19 situated in the area of the gear rim 18 of the ring gear 9 in the upper end area of the casing insert 31 with the casing interior of the gearing casing 14 (FIG. 4). The storage chamber 17 is connected with a casing passage 16 of the gearing casing 14 by means of an outlet opening 22 constructed to form an overflow device 30 on the other end of the casing insert 31. The casing passage 16 has a mouth section 23 openly leading out into the casing interior 20 of the partial casing 15. At the point of the partial casing 15 which is the lowest in the installed position, the casing insert 31 has a lower opening 21 which connects the storage chamber 17 with the casing interior 20 and can be closed by a stop valve 24 which is controlled as a function of the temperature.

On its bottom side, the gearing casing 14 has a joint face 26 for the fastening of an upwardly open oil pan 25. The oil pan 25 and the joint face 26 adjoin the partial casing 15 in a direction which is perpendicular to the main axis 5—5, in which case the joint face 26 is situated in a casing plane of the gearing casing 14 which is in parallel with respect to the main axis 5—5 and is aligned approximately horizontally in the installed position.

The gearing casing 14 has a casing duct 27 whose one duct end 28 leads out into the casing passage 16. The other duct end 29 of the casing duct 27 leads out at a different point in the joint face 26. This point is situated between a lateral wall of the oil pan 25 and a control casing arranged in the oil pan 25 and is in an open connection with the interior of the oil pan 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A driving arrangement for a motor vehicle, comprising:
   a differential gearing having a central axis arranged in alignment with a main axis of a driving axle;
   a ring gear non-rotatably connected with a planet wheel carrier of the differential gearing, said ring gear being arranged concentrically with respect to the central axis and meshing with a gear wheel of a gear box shaft of a gear change box, said gear change box arranged via its axis of rotation in parallel to the main axis;
   a gearing casing carrying said gear box shaft;
   a partial casing carrying the differential gearing, said partial casing being arranged immovably in a liquid-tight manner with respect to said gearing casing, said ring gear being accommodated at least partially in said partial casing;
   a casing passage connecting a casing interior of the gearing casing and the partial casing with one another;
   wherein said partial casing includes a storage chamber extending at least partially concentrically with respect to the main axis, said storage chamber at least partially enclosing the differential gearing;
   wherein with respect to the main axis, said storage chamber is arranged axially next to the ring gear, said storage chamber having an upper inlet opening situated in an area of a gear rim of the ring gear, a lower opening leading into the casing interior of the partial casing which accommodates the ring gear, and an outlet opening communicating with said casing passage; and
   wherein said casing passage has a mouth section in the casing interior of the partial casing which is situated in the area of the gear rim of the ring gear; and
   a stop valve arranged to close the lower opening of the storage chamber as a function of temperature.

2. The driving arrangement according to claim 1, further comprising:
   an oil pan situated in a housing plane parallel to the main axis and arranged approximately horizontally in an installed position;
   wherein said gearing casing has a joint face for joining said oil pan on an underside, said joint face extending in a direction perpendicular to the main axis in an area adjoining the partial housing; and
   wherein the gearing casing further has a casing duct which, on one duct end, leads out into the casing passage and, on another duct end, leads out toward the joint face.

3. The driving arrangement according to claim 1, wherein said outlet opening is formed as an overflow device which projects into said casing passage.

4. The driving arrangement according to claim 2, wherein said outlet opening is formed as an overflow device which projects into said casing passage.

5. The driving arrangement according to claim 1, further comprising a casing insert used as said storage chamber.

6. The driving arrangement according to claim 2, further comprising a casing insert used as said storage chamber.

7. The driving arrangement according to claim 3, further comprising a casing insert used as said storage chamber.

8. The driving arrangement according to claim 5, wherein the partial case is divided in a casing plane perpendicular to the main axis into a first casing part constructed in one piece with a converter casing and into a second casing part constructed in one piece with said gearing casing;

wherein said casing insert is held on the first casing part.

9. The driving arrangement according to claim 6, wherein the partial case is divided in a casing plane perpendicular to the main axis into a first casing part constructed in one piece with a converter casing and into a second casing part constructed in one piece with said gearing casing;

wherein said casing insert is held on the first casing part.

10. The driving arrangement according to claim 7, wherein the partial case is divided in a casing plane perpendicular to the main axis into a first casing part constructed in one piece with a converter casing and into a second casing part constructed in one piece with said gearing casing;

wherein said casing insert is held on the first casing part.

11. The driving arrangement according to claim 5, wherein the casing insert is comprised of a hollow body having a U-shaped cross-section and leg walls situated in parallel to the main axis in an installed position, along with a ring-shaped closing cover.

12. The driving arrangement according to claim 8, wherein the casing insert is comprised of a hollow body having a U-shaped cross-section and leg walls situated in parallel to the main axis in an installed position, along with a ring-shaped closing cover.

13. The driving arrangement according to claim 11, further comprising screw bolts arranged to clamp said hollow body between said ring-shaped closing cover and the first casing part.

14. The driving arrangement according to claim 12, further comprising screw bolts arranged to clamp said hollow body between said ring-shaped closing cover and the first casing part.

* * * * *